United States Patent [19]

Lehmann

[11] Patent Number: 4,796,659

[45] Date of Patent: Jan. 10, 1989

[54] HIGH RESPONSE UNLOADING VALVE

[76] Inventor: George F. Lehmann, 155 Gunn Avenue, Cambridge, Ontario, 2Z5, Canada

[21] Appl. No.: 136,703

[22] Filed: Dec. 22, 1987

[51] Int. Cl.⁴ .............................................. G05D 16/00
[52] U.S. Cl. .................................. 137/492; 137/492.5
[58] Field of Search ............... 137/489, 490, 488, 485, 137/492, 492.5

[56] References Cited

U.S. PATENT DOCUMENTS

| 191,078 | 5/1877 | Scovell | B7/490 |
| 3,399,696 | 9/1968 | Shaw | 137/489 X |

Primary Examiner—Alan Cohan

[57] ABSTRACT

This invention relates to a fast response relief valve that includes a housing; a low inertia trigger valve reciprocable with respect to the housing between an open and closed position on a trigger valve seat; and a low inertia relief valve reciprocable with respect to the housing between an open and a closed position on a relief valve seat. The trigger valve seat and the relief valve seat are each a positive stop for their respective valves.

17 Claims, 2 Drawing Sheets

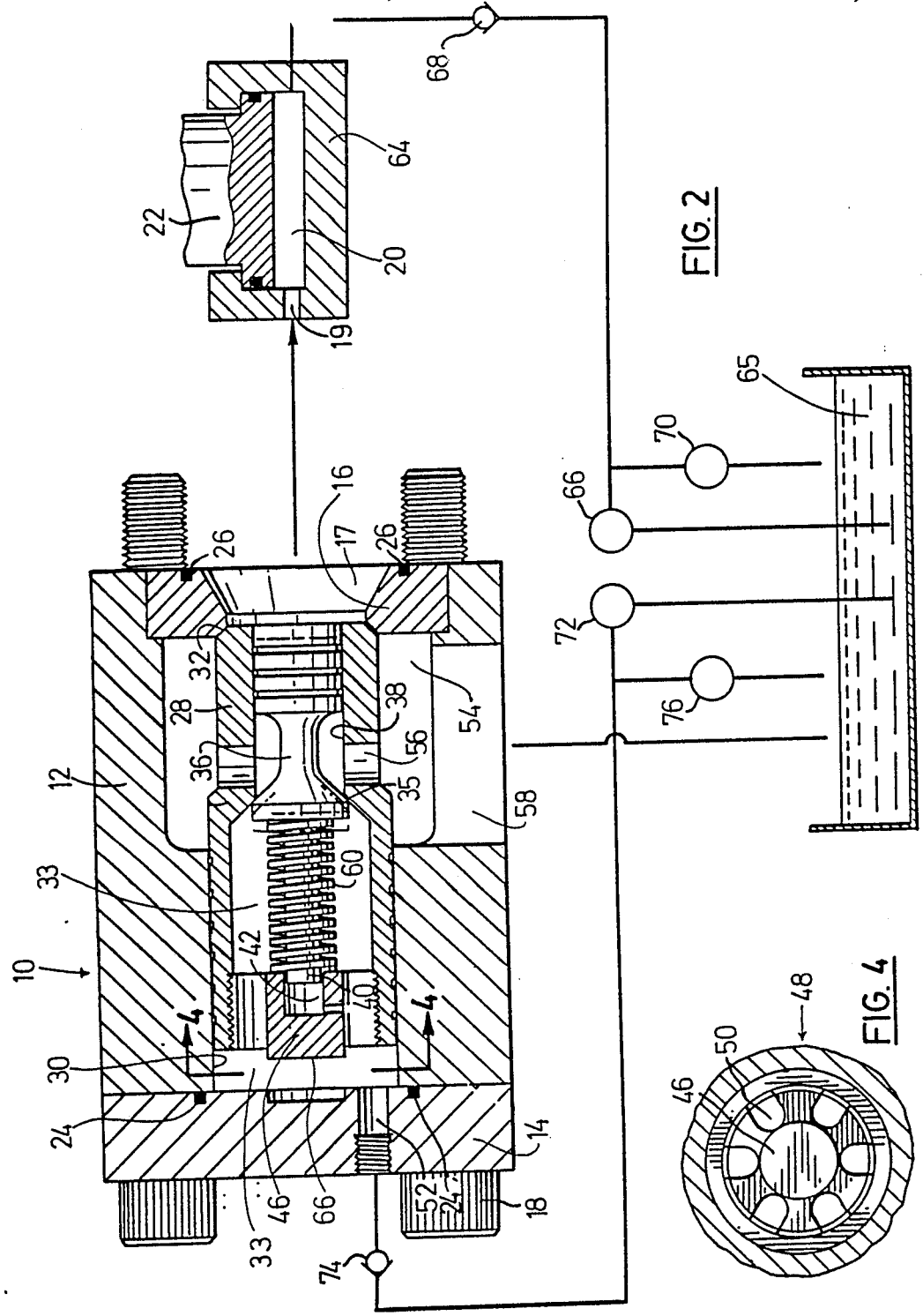

HIGH RESPONSE UNLOADING VALVE

This invention relates to a hydraulic relief valve responsive to sense and relieve excessive pressure in a pressurized chamber.

This hydraulic relief valve has a particular but not exclusive application to relieving an overload in mechanical presses. Mechanical presses are commonly used for forming objects between dies. In these presses, the upper die is carried repeatedly by a reciprocating ram into and out of co-operative relation with the lower die in the forming operation.

Overload can occur during the operation of such a mechanical press due to obstruction or to misalignment of the dies. This can cause serious damage to the press and to the dies and it is important to sense and relieve overload quickly and then stop power input to the ram.

Hydraulic systems have been developed which are capable of sensing and relieving overload quickly and which are capable of then stopping power input to the ram. In the use of these systems a hydraulic overload chamber is provided within the ram. This chamber is pressurized with a hydraulic fluid from a pressure controlled source. As the ram descends, pressure in the hydraulic overload chamber is increased due to die action. These systems sense the fluid pressure in the overload chamber and act to relieve an undue increase in pressure by venting the pressurized overload chamber to atmosphere or a lower pressure chamber. When so vented, the overload chamber collapses and relieves the overload. It also sets a control apparatus into motion that disengages the drive to the ram of the press.

To properly protect the mechanical press, the relief system should preferably be able to vent the overload chamber in the ram and permit its collapse in approximately a couple of milliseconds. This requires a low inertia relief valve element that can be accelerated to its open position by the full force of the overload pressure acting on the relief valve element's area exposed to the overload chamber. The more simple hydraulic relief systems of the prior art have been inadequate because they are slow. Low inertia valve assemblies have been developed but for one reason or another they have not been reliable in use.

U.S. Pat. No. 4,015,620 to Louis E. Carrieri discloses a valve assembly having a light weight low inertia single spool valve element that is designed to accelerate its opening under the full force produced by the overload pressure acting on spool's area exposed to the overload chamber and vent an abnormally high pressure in the overload chamber. It is effective in some conditions of operation, but, like other relief valves, it is insensitive to low flow rates. Since the motion of the ram in a mechanical press is sinusiodal, its velocity approaches and reaches zero as the ram approaches and reaches its bottom dead centre position. Also, most overloads in mechanical presses will occur in this region of low ram velocity due to improper die setting practices or simply because many press users purposely bottom out a die to give the formed part its final set. Overloads of this nature, occurring only several thousands of an inch above bottom dead centre, must only displace a small volume of fluid from the overload chamber within the ram to relieve the excessive pressure build up, which is occurring at a relatively slow rate. Carrieri's valve, which requires by design a short cylindrical sealing surface between the relief valve spool and its housing to seal the overload chamber from the relief valve's vent, possesses an inherently poor seal with a leak rate that can exceed the flow rate from the overload chamber, making it ineffective under the common conditions described above. Low flow rates from the overload chamber within the ram can also be encountered higher up in the press stroke on presses equipped with slow inch drives used for die tryout. If an overload of this type cannot be detected because of leakage by the overload valve, a multi-point press could be seriously damaged if the overload occurred under only one point as its overload chamber could completely collapse and cause the press ram to twist.

In addition to the drawbacks described above, leakage past the overload valve from the overload chamber within the ram can cause the overload system to malfunction at pressures encountered below the overload pressure. Since most overload relief valves rely on an area differential across the relief valve spool to bias the valve closed, it becomes necessary that the pressure build-up within the overload chamber exceed the initial pump pressure used to preload the overload chamber. Any leakage that occurs past the overload valve from the overload chamber at these higher pressures cannot be replenished by the pump. As a result the overload chamber will collapse by the amount of this leakage and cause complete loss of overload chamber pressure as soon as the press ram passes through bottom dead centre. Since a certain amount of overload chamber pressure is required for proper cycling of the press, pressure sensing devices are normally present and will stop the press if the overload chamber pressure is lost, as it would be above.

This invention overcomes the difficulties of Carrieri and other prior art by providing two leak proof low inertia valve elements, a trigger valve element and a relief valve element, both of which are designed to accelerate their sequential opening under the full force produced by the overload pressure acting on each element's area exposed to the overload chamber.

According to this invention, there is provided a fast response relief valve comprising: a housing having a pressure setting chamber and a pressure sensing chamber; a trigger valve seat; a low inertia trigger valve element extending between said pressure setting chamber and said pressure sensing chamber and reciprocable along a path between said pressure sensing chamber and said pressure setting chamber between an open and a closed position on said trigger valve seat such that said trigger valve element is responsive to the differential in force between said pressure sensing chamber and said pressure setting chamber; a relief valve element seat; a low inertia relief valve element extending between said pressure setting chamber and said pressure sensing chamber and reciprocable along a path between said pressure sensing chamber and said pressure setting chamber between an open and a closed position on said relief valve seat such that said relief valve element is responsive to the differential in force between said pressure sensing chamber and said pressure setting chamber; said trigger valve element seat and said relief valve element seat each being a positive stop for their respective valves; a pressure relief passage; said trigger valve element when seated on its seat being adapted to seal said pressure setting chamber and said pressure sensing chamber from said pressure relief passage and when open adapted to permit communication between said pressure setting chamber and said pressure relief passage, while still maintaining said seal between said sensing chamber and said relief passage; said relief valve element when closed being adapted to seal said pressure setting chamber and said pressure sensing chamber from said pressure relief passage and when open being adapted to permit communication between said pressure sensing chamber and said pressure relief passage, while still maintaining said seal between said setting chamber and said relief passage; said trigger valve element and said relief valve element being reciprocable as aforesaid independently of each other.

In another aspect there is provided a fast response relief valve comprising: a housing having a pressure setting chamber, a pressure sensing chamber, and a pressure relief passage intermediate said pressure setting chamber and the said pressure sensing chamber; a relief valve element seat between said pressure sensing chamber and said pressure relief passage; a relief valve element extending axially between said pressure sensing chamber and said pressure setting chamber and reciprocable along its axis between an open and a closed position on said relief valve seat; a trigger valve seat between said pressure setting chamber and said pressure relief passage; a trigger valve element extending axially between said pressure sensing chamber and said pressure setting chamber and reciprocable along its axis between an open and closed position on said trigger valve seat; a trigger valve element seal between said pressure sensing chamber and said pressure relief passage; a relief valve seal between said pressure sensing and said pressure relief passage; whereby said trigger valve element is responsive to the differential in force between said pressure sensing chamber and said pressure setting chamber and when seated on its seat, sealing said pressure setting chamber and said pressure sensing chamber from said pressure relief passage and when unseated from its seat permitting communication between said pressure setting chamber and said pressure relief passage while maintaining said seal between said pressure sensing chamber and said pressure relief passage and said relief valve element is responsive to the differential in force between said pressure sensing chamber and said pressure setting chamber and when seated on its seat, sealing said pressure setting chamber and said pressure sensing chamber from said pressure relief passage and when unseated fromits seat permitting communication between said pressure sensing chamber and said pressure relief passage, while maintaining said seal between said pressure setting chamber and said pressure relief passage.

By design, the area ratio across the trigger valve element upon which the setting and sensing fluid pressures act is preferably made substantially less than the area ratio across the relief valve element upon which the same setting and sensing fluid pressures act. This difference in area ratios across the two valve elements ensures that the trigger valve element will always respond first to an overload pressure, shifting axially while still maintaining a leak proof seal with respect to the overload chamber within the ram. This feature ensures that the valve remains sensitive to low flow rates as the total volume of high pressure fluid forced out of the overload chamber by an overload is available to shift the trigger valve element to an open position with respect to the setting pressure end of the trigger valve element and a venting chamber. The metal to metal contact seat at this juncture permits the loss of setting pressure fluid for any incremental shift of the trigger valve element which in turn completely unbalances both the trigger and relieve valve elements and causes them to accelerate to their fully open positions under the full pressure of the overload fluid. In the case when the overload chamber pressure produces a force that approaches or equals the force produced by the setting pressure holding the trigger valve element closed, the trigger valve element may shift only slightly, but not enough to vent sufficient setting pressure to unbalance the trigger valve element. Under these conditions, no loss of fluid is experienced by the overload chamber within the ram as the trigger valve element remains leak proof at this juncture for any amount of axial movement and the larger area ratio across the relief valve element ensures that it remains leak proof at its overload chamber juncture. As soon as the press ram begins its upstroke, the setting pressure will reseat the trigger valve element and force the incremental amount of fluid from the overload chamber used to shift the trigger valve element slightly back into the overload chamber, preventing any loss of overload chamber pressure at that instant.

The invention will be clearly understood after reference to the following detailed specification read in conjunction with the drawings. In the drawings:

FIG. 2 is a sectional illustration through the relief valve showing the valve elements seated against their respective seats as they would be seated in use and connected to a schematically illustrated overload chamber and schematically illustrated pressure setting assembly;

Figure 1:
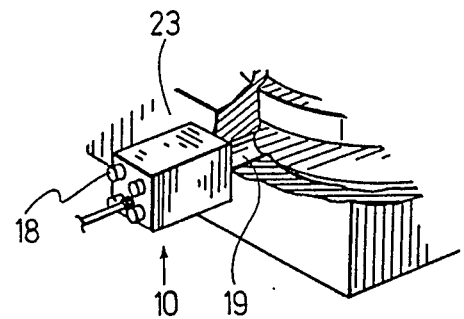
FIG. 1 is a schematic illustration of a relief valve according to the invention mounted on the overload housing within a ram of a press.
Figure 3:
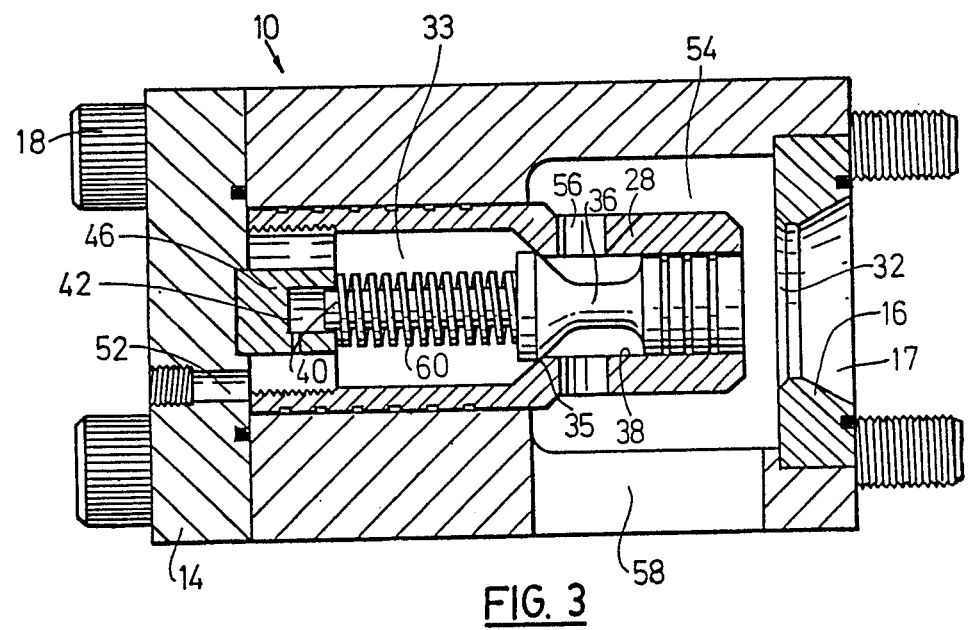

FIG. 3 is a cross-sectional illustration of the relief valve, similar to that shown in FIG. 2, unpressurized and showing the relief valve element in a floating and unseated position and showing the trigger valve element spring biased to a closed position; and FIG. 4 is a view along the line 4—4 of FIG. 2 showing the disposition of the mounting hub for the alignment pin of the trigger valve element.

The relief valve is generally indicated by the numeral 10. It has a tubular housing 12 closed at one end by a plate 14 and at its other end by a plate 16. Four bolts 18 extend through the housing and mount the valve on the press that contains the overload chamber to be monitored.

In this latter respect it will be noted that, as illustrated in FIG. 2, the plate 16 is formed with a pressure sensing chamber 17 which communicates with a passage 19 that in turn communicates with the overload chamber 20 of the ram 22 of a press. It is the pressure in the overload chamber 20 that is to be monitored. The bolts 18 thread into threaded openings in the side of the overload housing 23. It will be apparent as the bolts are tightened that the plates 14 and 16 are secured to the tubular body portion 12 to form the assembly.

Numerals 24 and 26 refer to seals that ensure a tight hydraulic fit. A light weight low inertia relief valve element 28, annular in cross-section, is reciprocable within a bore 30 of the housing. Relief valve element 28 has a seating surface that seats on a valve seat 32 of the end plate 16 in use.

In use, as will be referred to later, relief valve element 28 is normally biased to the right, as shown in FIG. 2, under the action of the pressure in the pressure setting chamber 33, to seat against valve seat 32 of end plate 16 and seal the pressure sensing chamber 17 from the pressure relief passage 54.

The assembly includes a light weight low inertia trigger valve element 36 which is reciprocable in a bore 38 of the relief valve element 28. The trigger valve element 36 has an alignment pin 40 extending therefrom that freely enters into a bore 42 of the hub 46 of the wheel generally indicated by the numeral 48. It will be noted that the wheel, generally indicated by the numeral 48, has openings 50 radially spaced thereabout so that the setting pressure communicated to the interior of the setting chamber 33 through opening 52 extends throughout the setting chamber 33 and against trigger valve element 36.

The trigger valve element 36 and the relief valve element 28 each slide in bores as explained. They have circumferentially extending grooves therearound to provide a good sliding fit in accordance to standard practice. The length of the sliding contact of each valve element in its respective bore is sufficiently long to achieve a good seal and at the same time an easy fit under conditions of the designed pressure differential between the pressure sensing chamber 17 and the pressure setting chamber 33. It will be apparent by lengthening the contact one can improve the seal and it is significant that the design of the assembly is such that length can be increased to achieve these objectives.

A vent chamber 54, annular in cross-section, communicates with the interior of the sleeve-like relief valve element through openings 56. The vent chamber 54 communicates with atmosphere through a radially extending duct indicated by the numeral 58. A spring 60 is compressed between the hub 46 and a shoulder on the trigger valve element 36 to urge the trigger valve element 36 against its seat 35 on the relief valve element under non-operating conditions. This is a relatively light spring and its purpose is to achieve the seating of the trigger valve element when the valve assembly resets itself after an overload condition in use.

In use, the operation of the spring 60 permits the trigger valve element 36 to close first after the valve assembly has been operated to vent the overload chamber 20 and each of the valve elements 28 and 36 has been moved to the open position. Spring 60 has a strength that will close the trigger valve element 36 against its seat 35 on the relief valve element 28 whereby to seal the setting chamber 33 from the pressure relief passage 56. Fluid entering the setting chamber 33 will again build up pressure in this chamber and force the relief valve element 28 against its seat 32 which resets the valve by sealing the sensing chamber 17 from the pressure relief passage 54.

As indicated above, this valve assembly has a practical use in the sensing of overload in the operation of a mechanical press. It is known to provide an overload chamber 20 for the ram of a mechanical press. The overload chamber is filled with hydraulic fluid at a predetermined pressure. As the ram bears downwardly to perform its pressing operation, the overload chamber is subjected to the reaction of the die elements. This valve assembly vents the overload chamber to atmosphere and permits its collapse if the pressure in the overload chamber due to die element reaction exceeds a predetermined amount.

In the simplified schematic illustration of a such an arrangement in FIG. 2 of the drawings the numeral 22 refers to the ram of the press and the numeral 64 refers to an element that is connected to a die of the press. A hydraulic fluid under pressure is contained in the overload chamber 20. It will be apparent that as the ram comes down and the dies engage, pressure in the overload chamber 20 will build up. The present invention is designed to sense the pressure in the overload chamber 20 and to relieve the pressure if it exceeds a predetermined amount.

In use, the relief valve 10 is bolted by means of bolts 18 to the overload housing 23 so that the pressure sensing chamber 17 in the end plate 16 of the relief valve housing communicates with the overload chamber 20 through passage 19. The bolts are secured sufficiently to achieve a good seal at the seals 24, 26. Numeral 65 refers to a reservoir for hydraulic fluid and pump 66 pumps fluid from the reservoir 65 through the check valve 68 into the overload chamber 20. Check valve 68 permits flow only into the chamber 20. Numeral 70 is a pump relief valve set to drain output of the pump 66 over and above a predetermined pressure back into the reservoir 65. Thus, by an appropriate setting of the reservoir relief valve 70, one can set the pressure in the overload chamber 20.

Numeral 72 refers to a pump for pressurizing the setting chamber 33 of the housing 10. It likewise has a check valve 74 in its line which will permit the flow of hydraulic fluid only in a direction into the chamber 33 of the casing. It also has a reservoir relief valve 76 that is set to achieve a predetermined pressure in the chamber of the casing in a similar manner to the relief valve 70. Varying the pressure setting of relief valve 76 will vary the pressure at which the overload valve will sense a press overload.

Thus by operation of the relief valves 70 and 76, one can set the pressures within the overload chamber 20 and the pressure setting chamber 33. The pressure sensing chamber 17 is at the same pressure as the overload chamber 20.

In the operation of the overload relief valve as connected hydraulically in FIG. 2, pump 72 and valve 76 are operated to raise the pressure in the setting chamber 33 on the inside of the relief valve element 28 to the overload response pressure desired which is somewhat below the pressure that will build up in the overload chamber under die operation as the dies are moved into normal co-operative relation with its mating die because of the area differential across both trigger and relief valve elements. The pump 66 and valve 70 are operated to set the normal pressure in chamber 20 which is normally, but not necessarily, substantially below the pressure in setting chamber 33.

FIG. 2 shows schematically the position of the trigger valve element and relief valve element when the pressure setting chamber is pressurized to close the trigger valve element 36 and relief valve element 28 against their respective seats and maintain them closed against the normal pressure in the overload chamber 20 and the pressure sensing chamber 17 as maintained by pump 66.

The area ratios across both the trigger valve element and relief valve elements in their directions of closure are such that, at the operating pressures chosen, both valve elements are biased against their respective seats when pressurization is achieved.

Under normal conditions of press operation the pressure in the overload chamber 20 of the ram and in the pressure sensing chamber 17 will increase and decrease cyclically as the dies go into and out of operative relation. The force differential existing across both valve elements between the setting chamber 33 and the sensing chamber 17 is such that the trigger valve element 36 and relief valve element 28 will not open.

If, however, the dies should become obstructed or the like and become subjected to unduly high forces as they move towards each other, the pressure in the overload and sensing chambers, 20 and 17 respectively, will increase above a predefined limit. When this maximum allowable pressure is exceeded, it will produce a force on the end of the trigger valve element exposed to sensing chamber 17 that exceeds the force maintained on its opposite end by pump 72 and spring 60 forcing the trigger to shift to the left and open its metal to metal seal at seat 35 as seen in FIG. 2. At this instant, due to the larger area ratio across the relief valve element 28, the force produced by pump 72 on the area of the relief valve element exposed to the setting chamber 33 still exceeds the force produced by the overload pressure acting on its other end in sensing chamber 17 and the seal at seat 32 of the relief valve element is maintained, preventing any loss of fluid from the overload chamber 20 during this incremental period of time. This important feature allows the valve to remain stable when operating at or near overload pressures as any minor pressure spikes will not cause any loss of fluid from the overload chamber. If, or as, the overload continues, the trigger valve element will be forced further off of its seat 35 allowing the pressure setting chamber 33 to be communicated to atmosphere through the vent passages 56 and vent chamber 54 and duct 58 and back to the reservoir 65. The rapid depressurizing of the pressure setting chamber in this manner causes an enormous increase in net force available to force the trigger valve element 36 fully open and simultaneously causes the relief valve element 28 to become completely unbalanced and shift to the left from its seat 32 under the full force produced by the overload pressure as viewed in FIG. 2. As the relief valve element 28 shifts, the sensing chamber 17 and overload chamber 20 vent through vent chamber 54, duct 58 and back to reservoir 65. This immediately depressurizes the overload chamber 20 and permits the collapse axially of the ram 22 to prevent further buildup of dangerous forces at the dies.

The collapse of the chamber 20 sets into motion circuitry to cut off power to the ram.

Thus, the fast depressurizing of the overload chamber 20 prevents immediate danger of destruction to the dies and operates a switch to turn off the power to the ram.

The closure of the valve elements and repressurizing of the overload chamber 20 has been indicated above. Once the chamber of the valve assembly 10 has been depressurized, spring 60 closes the trigger valve element 36. Relief valve element 28 floats in the open position at this stage. Closure of the trigger valve permits build-up of pressure in the pressure setting chamber 33 under the continuous operation of pump 72 and relief valve 76. As pressure is built up in the pressure setting chamber 33, the relief valve element 28 moves to the right and seats on its seat. Once seated, the pump 66 and relief valve 70 build up the normal set pressure in the overload chamber 20.

It will be apparent that the operation of the trigger valve element 36 and the relief valve element 28 is a function of the pressures on each side of their respective seats and their areas on each side of their respective seats that are subjected to the pressures.

Spring 60 is also a minor factor in the forces acting on the trigger valve element. It is, however, a relatively weak spring and its principal function is to reset the trigger valve element 36 after operation.

In operation it is the difference in force on the two ends of the valve elements that is responsible for operation and, with the two pump arrangement illustrated, it is a more practical design for the valve elements to have a relatively high pressure in the setting chamber 33 of relief valve housing and a lower pressure in the sensing and overload chambers, 17 and 20. By having a lower normal pressure in the overload chamber 20, retention of ram 22 in its housing when pressurized but under no external load due to die operation is easier and permits a simplified joint design. It should be noted that the valve will function equally well with equal initial pressures on both ends of the valve elements.

While two pumps have been illustrated to achieve the dual pressures in the setting chamber 33 and the overload chamber 20 and sensing chamber 17, it will be apparent to those skilled in the art that similar dual pressures could be achieved with a single pump and a pressure reducing valve arrangement.

In a typical mechanical press operation, one might want to limit the pressure build-up in the overload chamber and pressure sensing chamber to about 2500 p.s.i. The relief valve of this invention as illustrated in the hydraulic hook-up of FIG. 2 can protect against pressures of this order by operating with a pressure that is somewhat less than 2500 p.s.i. in the setting chamber 33 due to the area ratios across the valve elements, and a pressure of about 500 p.s.i. in the overload and sensing chambers 20 and 17. This is an advantage of the double pump operation. If the device were operated from a simple single pump operation, it would be necessary to have equal pressures on each side of the valve members under conditions of normal operation.

It will be understood that in devices of this kind, the area differential across the ends of the valve elements is a factor in their operation and by selection of appropriate areas, the setting pressure is lower than the sensing pressure at the point where the forces on the trigger valve element are balanced just prior to operation of the trigger valve by an overload.

It is significant that the inertia of the trigger valve element 36 is absorbed by the relief valve element and the impact force adds to the hydraulic force acting on the relief valve element to make the embodiment of the invention illustrated in the drawings more responsive.

Numeral 66 refers to a snubbing nose on the hub of wheel 48 which enters a fluid filled cavity on the plate 14 to decelerate both valve elements and prevent damage to them in operation.

The embodiment of the invention illustrated is by way of example only. It is not contemplated that the trigger valve be only within the pressure relief valve as shown. A valve wherein the trigger valve and relief valve were mounted for movement on spaced apart axis is thought to be within the scope of the invention.

The figures used in these examples are used for illustrative purposes only. It is not intended that the scope of protection be restricted to the single embodiment herein described but that it extend to cover the invention as a whole as claimed in the appended claims.

I claim:

1. A fast relief valve comprising: a housing having a pressure setting chamber and a pressure sensing chamber;

a trigger valve seat;

a low inertia trigger valve element extending between said pressure setting chamber and said pressure sensing chamber and reciprocable along a path between said pressure sensing chamber and said pressure setting chamber between an open and a closed position on said trigger valve seat such that said trigger valve element is responsive to the differential in force between said pressure sensing chamber and said pressure setting chamber;

a relief valve element seat;

a low enertia relief valve element extending between said pressure setting chamber and said pressure sensing chamber and reciprocable along a path between said pressure sensing chamber and said pressure setting chamber between an open and a closed position on said relief valve seat such that said relief valve element is responsive to the differential in force between said pressure sensing chamber and said pressure setting chamber;

said trigger valve element seat and said relief valve element seat each being a positive stop for their respective valves;

a pressure relief passage;

said trigger valve element when seated on its seat being adapted to seal said pressure setting chamber and said pressure sensing chamber from said pressure relief passage and when open adapted to permit communication between said pressure setting chamber and said pressure relief passage, while still maintaining said seal between said sensing chamber and said relief passage;

said relief valve element when closed being adapted to seal said pressure setting chamber and said pressure sensing chamber from said pressure relief passage and when open being adapted to permit communication between said pressure sensing chamber and said pressure relief passage, while still maintaining said seal between said setting chamber and said relief passage;

said trigger valve element and said relief valve element being reiprocable as aforesaid independently of each other.

2. A fast response relief valve element as claimed in claim 1 in which said trigger valve element reciprocates within said relief valve element and said trigger valve element seat is formed within said relief valve element.

3. A fast response relief valve as claimed in claim 1 wherein the area ratio across said trigger valve element is equal to or less than the area ratio across said relief valve element.

4. A fast response relief valve as claimed in claim 3 wherein the relief valve element seal between said pressure setting chamber and said pressure relief passage is comprised of a cylindrical surface within the housing into which a close fitting long cylindrical surface on the relief valve element engages to provide a leak proof seal.

5. A fast response relief valve as claimed in claim 4 wherein the trigger valve element seal between said pressure sensing chamber and said pressure relief passage is comprised of a cylindrical surface within the relief valve element into which a close fitting long cylindrical surface on the trigger element engages to provide a leak proof seal.

6. A fast response relief valve as claimed in claim 1 or claim 4 having a bias spring to bias said trigger valve element to a closed position whereby under conditions of atmospheric pressure in said pressure setting and pressure sensing chambers the trigger valve element will assume a closed position.

7. A fast response relief valve as claimed in claim 2 or claim 5 having a bias spring to bias said trigger valve element to a closed pposition whereby under conditions of atmospheric pressure in said pressure setting and pressure sensing chambers the trigger valve element will assume a closed position.

8. A fast response relief valve as claimed in claim 1 or claim 4 wherein said trigger valve element maintains a leak proof seal with respect to said sensing chamber regardless of its axial position within said housing.

9. A fast response relief valve as claimed in claim 2 or claim 5, wherein said trigger valve element maintains a leak proof seal with respect to said sensing chamber regardless of its axial position within the said relief valve element.

10. A fast response relief valve as claimed in claim 2 wherein the area ratio across said trigger valve element is equal to or less than the area ratio across said relief valve element.

11. A fast response relief valve comprising:
(a) a housing having a pressure setting chamber, a pressure sensing chamber, and a pressure relief passage intermediate said pressure setting chamber and the said pressure sensing chamber;
(b) a relief valve element seat between said pressure sensing chamber and said pressure relief passage;
(c) a relief valve element extending axially between said pressure sensing chamber and said pressure setting chamber and reciprocable along its axis between an open and a closed position on said relief valve seat;
(d) a trigger valve seat between said pressure setting chamber and said pressure relief passage;
(e) a trigger valve element extending axially between said pressure sensing chamber and said pressure setting chamber and reciprocable along its axis between an open and closed position on said trigger valve seat;
(f) a trigger valve element seal between said pressure sensing chamber and said pressure relief passage;
(g) a relief valve seal between said pressure setting chamber and said pressure relief passage; whereby said trigger valve element is responsive to the differential in force between said pressure sensing chamber and said pressure setting chamber and when seated on its seat, sealing said pressure setting chamber and said pressure sensing chamber from said pressure relief passage and when unseated from its seat permitting communication between said pressure setting chamber and said pressure relief passage while maintaining said seal between said pressure sensing chamber and said pressure relief passage and said relief valve element is responsive to the differential in force between said pressure sensing chamber and said pressure setting chamber and when seated on its seat, sealing said pressure setting chamber and said pressure sensing chamber from said pressure relief passage and when unseated from its seat permitting communication between said pressure sensing chamber and said pressure relief passage, while maintaining said seal between said pressure setting chamber and said pressure relief passage.

12. A fast response relief valve element as claimed in claim 11 in which said trigger valve element reciprocates within said relief valve element and said trigger valve element seat is formed within said relief valve element.

13. A fast response relief valve as claimed in claim 11 wherein the area ratio across said trigger valve element is equal to or less than the area ratio across said relief valve element.

14. A fast response relief valve as claimed in claim 12 wherein the area ratio across said trigger valve element is equal to or less than the area ratio across said relief valve element.

15. A fast response relief valve as claimed in claim 14 wherein the relief valve element seal between said pressure setting chamber and said pressure relief passage is comprised of a cylindrical surface within the housing into which a close fitting long cylindrical surface on the relief valve element engages to provide a leak proof seal.

16. A fast response relief valve as claimed in claim 15 wherein the trigger valve element seal between said pressure sensing chamber and said pressure relief passage is comprised of a cylindrical surface within the relief valve element into which a close fitting long cylindrical surface on the trigger element engages to provide a leak proof seal.

17. A fast response relief valve as claimed in claim 14 having a bias spring to bias said trigger valve element to a closed position whereby under conditions of atmospheric pressure in said pressure setting and pressure sensing chambers the trigger valve element will assume a closed position.

* * * * *